US012695150B2

(12) United States Patent
Qin et al.

(10) Patent No.: US 12,695,150 B2
(45) Date of Patent: Jul. 28, 2026

(54) BRACKET BODY, BRACKET, BATTERY UNIT AND ENERGY STORAGE POWER SUPPLY

(71) Applicant: SHENZHEN POWEROAK NEWENER CO., LTD, Shenzhen (CN)

(72) Inventors: Geng Qin, Shenzhen (CN); Hui Ma, Shenzhen (CN); Huisheng Guo, Shenzhen (CN)

(73) Assignee: SHENZHEN POWEROAK NEWENER CO., LTD, Shenzhen (CN)

( * ) Notice: Subject to any disclaimer, the term of this patent is extended or adjusted under 35 U.S.C. 154(b) by 76 days.

(21) Appl. No.: 18/043,352

(22) PCT Filed: Apr. 7, 2022

(86) PCT No.: PCT/CN2022/085613
§ 371 (c)(1),
(2) Date: Feb. 28, 2023

(87) PCT Pub. No.: WO2022/237406
PCT Pub. Date: Nov. 17, 2022

(65) Prior Publication Data
US 2023/0246284 A1    Aug. 3, 2023

(30) Foreign Application Priority Data
Dec. 14, 2021    (CN) .......................... 202111523659.1

(51) Int. Cl.
*H01M 10/00*        (2006.01)
*H01M 50/213*       (2021.01)
                    (Continued)

(52) U.S. Cl.
CPC ....... *H01M 50/291* (2021.01); *H01M 50/213* (2021.01); *H01M 50/262* (2021.01); *H01M 50/505* (2021.01)

(58) Field of Classification Search
CPC ............. H01M 50/291; H01M 50/213; H01M 50/262; H01M 50/505
See application file for complete search history.

(56) References Cited

U.S. PATENT DOCUMENTS 8,703,325 B2 * 4/2014 Pellenc ............. H01M 10/6557
                                                    429/96
2012/0021260 A1 * 1/2012 Yasui ................... H01M 10/615
                                                    429/71
(Continued)

FOREIGN PATENT DOCUMENTS

CN          207883774 U      9/2018
CN          110120480 A      8/2019
(Continued)

OTHER PUBLICATIONS

Machine translation of CN 104393210 (Year: 2014).*

*Primary Examiner* — Nicholas P D'Aniello
(74) *Attorney, Agent, or Firm* — Bayramoglu Law Offices LLC

(57) ABSTRACT

A bracket body, a bracket, a battery unit, and an energy storage power supply are provided. The bracket includes a base shell and a stopper, wherein the base shell is provided with a receiving groove for receiving a battery cell, the receiving groove runs through a first surface and a second surface of the base shell, and the first surface and the second surface are two opposite surfaces of the base shell; the stopper includes a connecting part and a resisting part, the connecting part is fixed to the first surface of the base shell and avoids the receiving groove, and the resisting part is connected to the connecting part; and the resisting part corresponds to the receiving groove and covers part of an edge of the receiving groove.

5 Claims, 7 Drawing Sheets

(51) Int. Cl.
        *H01M 50/262*        (2021.01)
        *H01M 50/291*        (2021.01)
        *H01M 50/505*        (2021.01)

(56)                    References Cited

U.S. PATENT DOCUMENTS

| | | | | |
|---|---|---|---|---|
| 2014/0193684 A1* | 7/2014 | Kwag | ................. | H01M 50/213 |
| | | | | 429/99 |
| 2014/0248520 A1* | 9/2014 | Ward | ............... | H01M 10/6557 |
| | | | | 429/100 |
| 2016/0329537 A1* | 11/2016 | Foreman | ............. | H01M 50/256 |
| 2017/0025657 A1* | 1/2017 | Reinshagen | ........ | H01M 50/284 |
| 2018/0114960 A1* | 4/2018 | Sato | .................... | H01M 50/209 |
| 2019/0372069 A1 | 12/2019 | Lee et al. | | |
| 2019/0372173 A1* | 12/2019 | Juzkow | ................. | H01M 10/65 |
| 2020/0006827 A1 | 1/2020 | Filter et al. | | |
| 2020/0343497 A1* | 10/2020 | Sun | ........................... | E05C 1/08 |
| 2022/0231381 A1* | 7/2022 | Ford | .................. | H01M 50/213 |

FOREIGN PATENT DOCUMENTS

| | | |
|---|---|---|
| CN | 211125717 U | 7/2020 |
| CN | 113555633 A | 10/2021 |
| CN | 113937400 A | 1/2022 |
| JP | S519221 U | 1/1976 |
| KR | 20150139250 A | 12/2015 |
| TW | 201421776 A | 6/2014 |

* cited by examiner

BRACKET BODY, BRACKET, BATTERY UNIT AND ENERGY STORAGE POWER SUPPLY

CROSS REFERENCE TO THE RELATED APPLICATIONS

This application is the national phase entry of International Application No. PCT/CN2022/085613, filed on Apr. 7, 2022, which is based upon and claims priority to Chinese Patent Application No. 202111523659.1, filed on Dec. 14, 2021, the entire contents of which are incorporated herein by reference.

TECHNICAL FIELD

The embodiment relates to the technical field of energy storage power supplies, in particular to a bracket body, a bracket, a battery unit and an energy storage power supply.

BACKGROUND

A battery refers to a cup, tank, or other containers or part of the space of a composite container containing an electrolyte solution and metal electrodes to generate electric currents, which can convert chemical energy into electric energy and has a positive electrode and a negative electrode. To meet the power demand of a power battery system of an electric vehicle or an energy storage battery system of State Grid Corporation of China, it is necessary to connect multiple single batteries in series and parallel, and then connect these battery units in series and parallel to reach a certain voltage level and capacity level to meet people's needs. At present, battery units are mostly obtained by assembling battery packs (assembled batteries, with battery units inside) with main control boxes, and a stackable installation mode is adopted most of the time.

SUMMARY

Technical scheme adopted in this embodiment is as follows. A bracket body is provided, including a base shell and a stopper, wherein the base shell is provided with a receiving groove for receiving a battery cell, the receiving groove runs through a first surface and a second surface of the base shell, and the first surface and the second surface are two opposite surfaces of the base shell; the stopper includes a connecting part and a resisting part, the connecting part is fixed to the first surface of the base shell and avoids the receiving groove, and the resisting part is connected to the connecting part; and the resisting part corresponds to the receiving groove and covers part of an edge of the receiving groove.

According to another aspect of the embodiment of the application, a bracket is provided, including a first bracket body and a second bracket body, wherein the first bracket body and the second bracket body are the above-mentioned bracket body, and the second bracket body rotates relative to the first bracket body in a mirroring mode in a predetermined direction, and is fixed to the first bracket body in a laminating mode.

According to another aspect of the embodiment of the application, a battery unit is provided, including the above-mentioned bracket, a battery cell and a conductive sheet, wherein the battery cell is installed in the receiving groove, the resisting part abuts against part of an edge of the battery cell, the conductive sheet includes a positioning hole adapted to the stopper, and the conductive sheet is fixed to a first surface of the bracket body through the positioning hole, and is electrically connected to an electrode of the battery cell.

According to another aspect of the embodiment of the application, an energy storage power supply is provided, including a plurality of the above-mentioned battery units, a positive electrode bus structure and a negative electrode bus structure, wherein the plurality of battery units are stacked in a direction perpendicular to the first surface and the second surface to form a battery unit module, and the positive electrode bus structure and the negative electrode bus structure are respectively connected to a total positive electrode and a total negative electrode of the battery unit module.

BRIEF DESCRIPTION OF THE DRAWINGS

In order to more clearly explain the technical scheme of the embodiments of this application, the drawings needed in the embodiments of this application will be briefly introduced below. Obviously, the drawings described below are only some of the embodiments of this application. For those of ordinary skill in the art, other drawings can be obtained according to the drawings without any creative effort.

DETAILED DESCRIPTION OF THE EMBODIMENTS

In order to facilitate the understanding of this embodiment, this embodiment will be described in more detail below with reference to the drawings and specific examples. It should be noted that when an element is expressed as "fixed" to another element, it may be directly on another element, or there may be one or more intervening elements in between. When an element is expressed as "connected" to another element, it may be directly connected to another element, or there may be one or more intervening elements in between. The terms "vertical", "horizontal", "left", "right" and the like used in this specification are for illustration purposes only.

Unless otherwise defined, all technical and scientific terms used herein have the same meanings as commonly understood by those skilled in the technical field of the application. Terms used in the specification of this embodiment are for the purpose of describing specific embodiments only, and are not intended to limit the embodiments. As used herein, the term "and/or" includes any and all combinations of one or more related listed items.

According to a traditional battery unit, a battery cell group is fixed to a bracket, and then a conductive sheet is welded to two ends of a battery cell exposed from the bracket, so as to realize electrical connection between multiple battery cells. In the process of implementing the embodiment, the inventor found that for the bracket of the traditional battery unit, an end of a receiving groove for receiving the battery cell extends to a middle to form a shielding part, thus preventing the battery cell from coming off the bracket when being installed in the receiving groove, but the shielding part is designed so that an electrode center of the battery cell is lower than an end face of the bracket, resulting in a distance between the battery cell and the conductive sheet, which is not conducive to the welding between the conductive sheet and the battery cell. Even if the conductive sheet and the battery cell are welded, false soldering occurs easily, thus affecting the electrical connection between the battery cells and the normal use of the battery unit.

Figure 1:
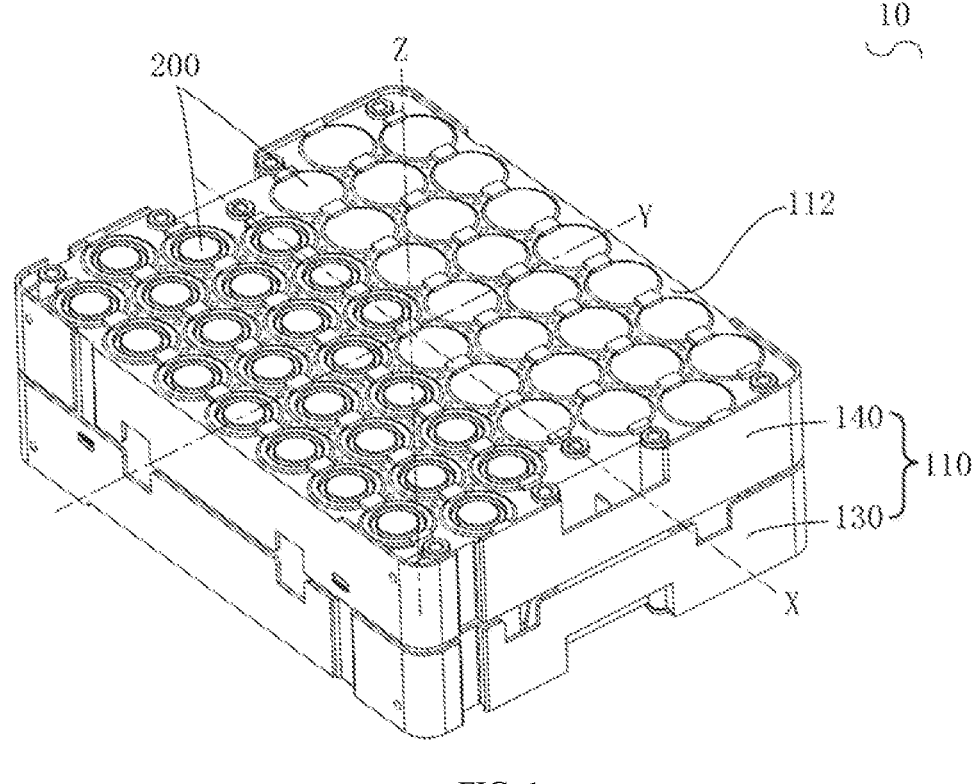
FIG. 1 is a perspective view of a battery unit of this embodiment.
Figure 2:
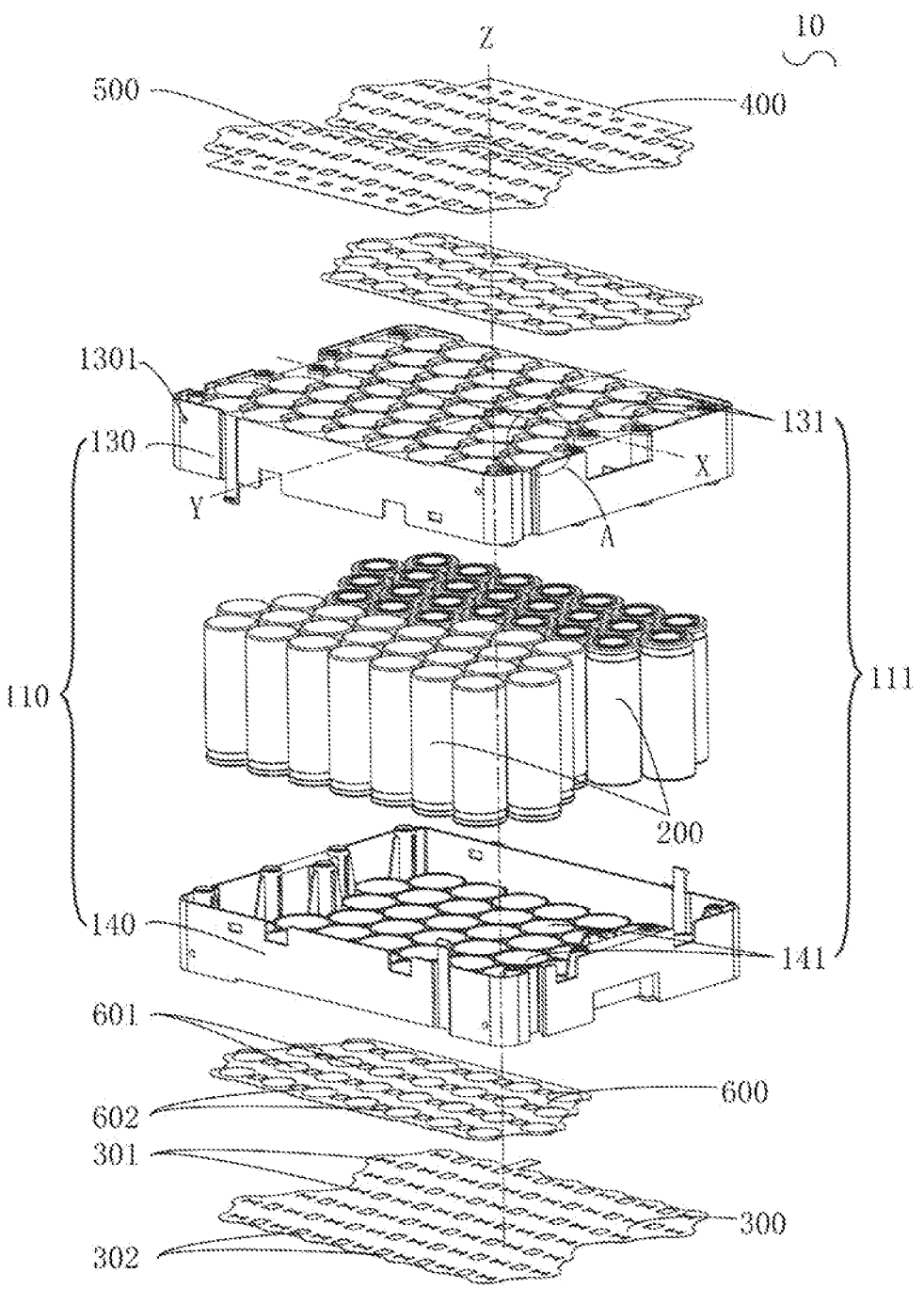
FIG. 2 is an exploded view of a battery unit of this embodiment.
Figure 3:
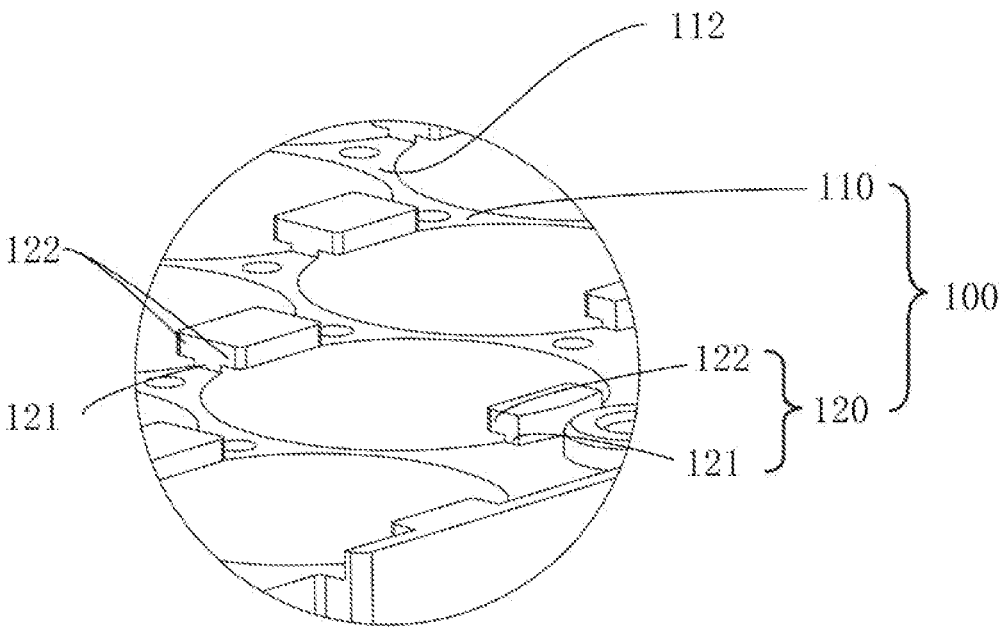
FIG. 3 is an enlarged view of part A in FIG. 2.
Figure 4:
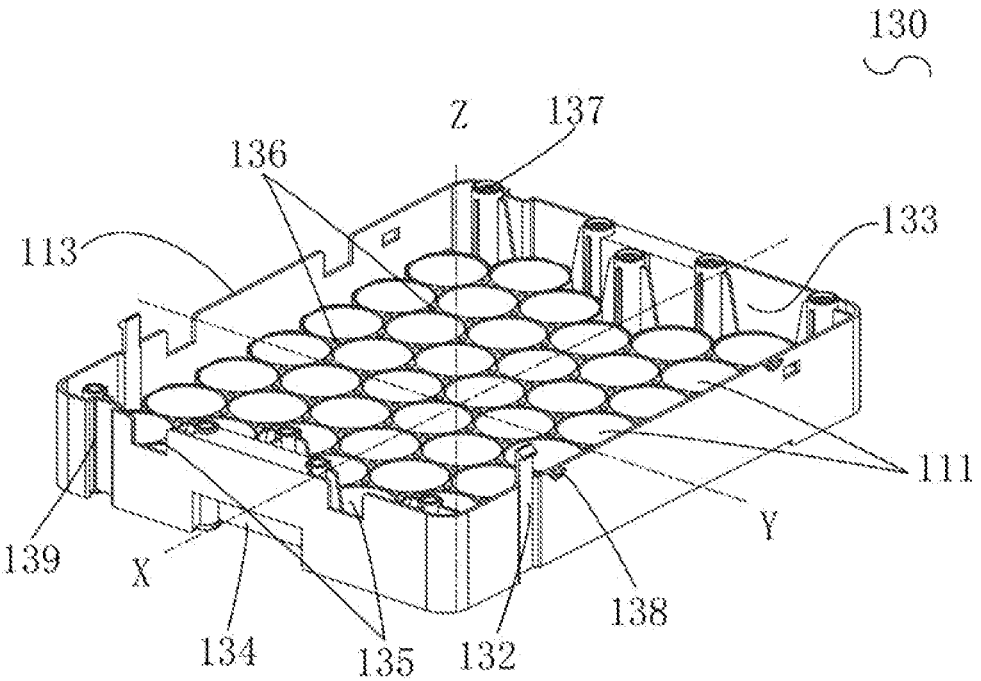
FIG. 4 is a perspective view of a first bracket body of this embodiment.
Figure 5:
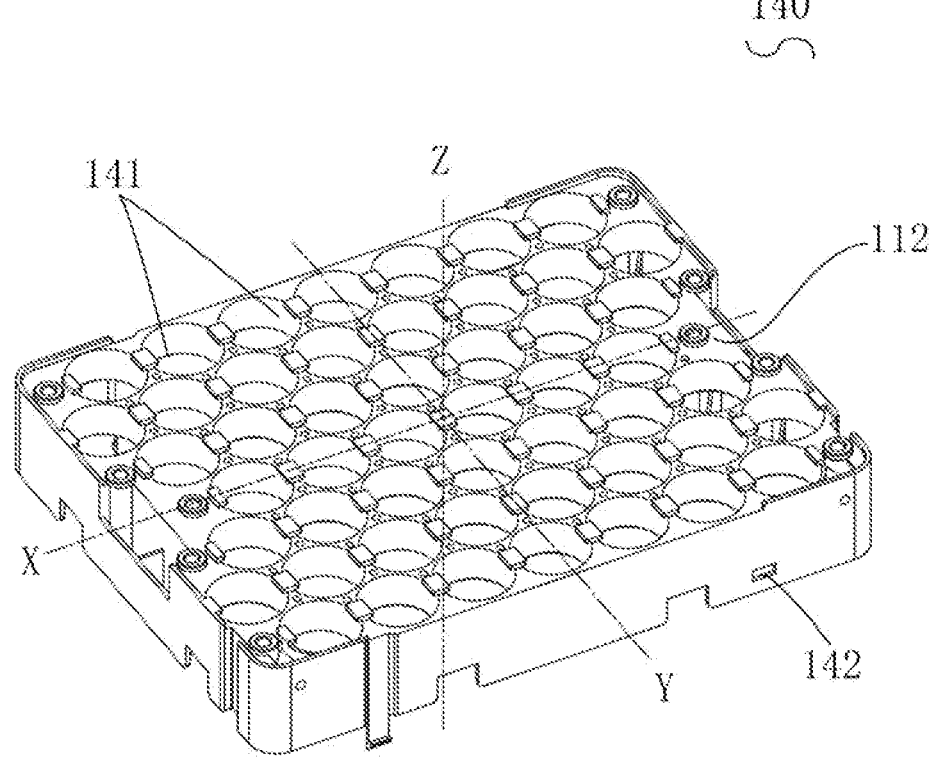
FIG. 5 is a perspective view of a second bracket body of this embodiment.

Please refer to FIGS. 1-5. FIGS. 1 and 2 respectively show a perspective view and an exploded view of a battery unit of this embodiment. FIG. 3 shows an enlarged view of part A in FIG. 2. FIGS. 4 and 5 are structural diagrams of upper and lower bracket bodies (a first bracket body and a second bracket body) in FIG. 2, respectively. A battery unit 10 includes a bracket 100 and a battery cell group 200, the bracket 100 includes a first bracket body 130 and a second bracket body 140, and the battery cell group 200 includes at least two battery cells. The bracket 100 includes a base shell 110 and a stopper 120. The base shell 110 is provided with a receiving groove 111 for receiving the battery cells, and the receiving groove 111 runs through a first surface 112 and a second surface 113 of the base shell 110, which are two opposite surfaces of the base shell 110. The stopper 120 includes a connecting part 121 and a resisting part 122. The connecting part 121 is fixed to the first surface 112 of the base shell 110 and avoids the receiving groove 111. The resisting part 122 is connected to the connecting part 121, and the resisting part 122 corresponds to the receiving groove 111 and covers part of an edge of the receiving groove 111. The battery cells are installed in the receiving groove 111, and battery cells in the battery cell group 200 face the same direction. The resisting part 122 covers part of an edge of the battery cell to prevent the battery cell from sliding out of the bracket 100 from the first surface 112 when installed in the receiving groove 111.

Please refer to FIGS. 4 and 5 for the above-mentioned base shell 110. The base shell 110 includes a first bracket body 130 and a second bracket body 140 which are fixed in a predetermined direction Z in a laminating mode. The first bracket body 130 and the second bracket body 140 have the same structure, are rectangular, and can rotate in the predetermined direction Z in a mirroring mode. The first bracket body 130 is provided with first receiving grooves 131, and the second bracket body 140 is provided with second receiving grooves 141. The first receiving grooves 131 and the second receiving grooves 141 extend in the predetermined direction Z, and each of the first receiving grooves 131 and one corresponding second receiving groove 141 are coaxially arranged to form a receiving groove 111 together to receive the battery cells. The first surface 112 is a side of the first bracket body 130 facing away from the second bracket body 140 or a side of the second bracket body 140 facing away from the first bracket body 130. The second surface 113 is a side of the first bracket body 130 close to the second bracket body 140 or a side of the second bracket body 140 close to the first bracket body 130. The first bracket body 130 and the second bracket body 140 are provided with a first clamping part 132 and a second clamping part 142, and the first clamping part 132 and the second clamping part 142 are used for cooperation to clamp and fix the first bracket body 130 and the second bracket body 140. The first bracket body 130 and the second bracket body 140 have the same structure, which can reduce the number of parts of the base shell 110, thereby reducing the number of molds and further reducing the production cost. It should be noted that the specific shapes of the first bracket body 130 and the second bracket body 140 are not limited in this application. In other embodiments of this application, the first bracket body 130 and the second bracket body 140 may be box structures or frame structures with other shapes such as prisms, columns, frustums, etc. In other embodiments of this application, the second bracket body 140 may not have the same structure as the first bracket body 130, and the receiving groove 111 is used to receive and expose an end of the battery cell. It should also be noted that the specific installation mode of the first bracket body 130 and the second bracket body 140 is not limited in the application. In other embodiments of the application, the first bracket body 130 and the second bracket body 140 can be connected by other connection modes such as screwing and hinging.

For the first bracket body 130, please refer to FIG. 4 for details, in combination with FIGS. 1 and 2. The number of the first receiving grooves 131 is 50, and the first receiving grooves 131 match the battery cells in shape and size. In this embodiment, the battery cell is a cylindrical battery cell, so the first receiving groove 131 is a cylindrical cavity. The 50 first receiving grooves 131 are arranged in a honeycomb pattern, and the staggered honeycomb-like arrangement can reduce a cross-sectional area of the bracket 100, thereby reducing the volume of the battery unit 10, making the structure of the first bracket body 130 more compact, thus improving the space utilization rate and user experience. It should be noted that the number of the first receiving grooves 131 and the specific arrangement of the first receiving grooves 131 are not limited in this application. In other embodiments of this application, the number of the first receiving grooves 131 may be 2, 20 or 30, and the first receiving grooves 131 may be arranged into a matrix or a circumferential array. It should also be noted that, in the embodiment of the application, the second bracket body 140 and the first bracket body 130 have the same structure, and the number and arrangement of the second receiving grooves 141 are the same as those of the first receiving grooves 131, which will not be repeated here.

For the battery cell group 200, please refer to FIGS. 1 and 2. The number of the battery cell groups 200 is two, each battery cell group 200 includes 25 battery cells, the battery cells are cylindrical battery cells, the battery cells of the two battery cell groups 200 face opposite directions, and a total of 50 battery cells of the two battery cell groups 200 are received in 50 first receiving grooves 131 together. It should be noted that this application does not limit the specific number of the battery cells in the battery cell groups 200. In other embodiments of this application, the number of the battery cells can be 1, 5 or 10, and the number of the battery cells in the two battery cell groups 200 should not be greater than the number of the first receiving grooves 131. It should also be noted that this application does not limit the specific shapes of the battery cell and the first receiving groove 131.

In other embodiments of this application, the battery cell may be, for example, a square battery cell, as long as the first receiving groove 131 matches the battery cell in shape and size.

Preferably, referring to FIG. 2, the battery unit 10 further includes a first conductive sheet 300, a second conductive sheet 400 and a third conductive sheet 500. The first conductive sheet 300, the second conductive sheet 400 and the third conductive sheet 500 are all provided with positioning holes 302, and the positions, shapes and sizes of the positioning holes 302 correspond to those of the stopper 120, respectively. The positioning holes 302 play a positioning role when the conductive sheet is mounted on the first surface 112, so as to prevent the deviation of a mounting position from affecting the welding effect. The first conductive sheet 300, the second conductive sheet 400 and the third conductive sheet 500 are all nickel sheets and are provided with a plurality of I-shaped welding holes 301, and the plurality of welding holes 301 are correspondingly arranged according to the arrangement of the receiving grooves 111. The first conductive sheet 300 is disposed on the first surface 112 of the second bracket body 140, and the first conductive sheet 300 is welded with electrodes of each battery cell in the two battery cell groups 200 through the welding holes 301. The second conductive sheet 400 and the third conductive sheet 500 are disposed on the first surface 112 of the first bracket body 130. The second conductive sheet 400 is welded to the electrodes of each battery cell in one battery cell group 200 through the welding holes 301, and the third conductive sheet 500 is welded to the electrodes of each battery cell in the other battery cell group 200 through the welding holes 301. The first conductive sheet 300 is used for parallel connection and series connection between the battery cells of the two battery cell groups 200, and the second conductive sheet 400 and the third conductive sheet 500 are used for parallel connection of the battery cells of a single battery cell group 200, and lead out a total electrode bus structure. It should be noted that the application does not limit the specific materials of the first conductive sheet 300, the second conductive sheet 400 and the third conductive sheet 500. In other embodiments of the application, the first conductive sheet 300, the second conductive sheet 400 and the third conductive sheet 500 may be made of other materials such as copper sheets and aluminum sheets, as long as electrical connection with the battery cells is realized. It should also be noted that the application does not limit the specific shape of the welding hole 301. In other embodiments of the application, the welding hole 301 may be cylindrical, prismatic or in other irregular shapes, as long as the electrode of the battery cell can be exposed.

Because an outer surface of the battery cell group 200 is wrapped with an insulating layer, and the insulating layer extends to edges of electrodes at two ends of the battery cell, the middle of the electrodes at the two ends of the battery cell is lower than an edge covered with the insulating layer. In addition, during the manufacturing process of the bracket 100, due to the injection molding process, the resisting part 122 may be burry or thickened on a side facing the first surface 112. The above two aspects will cause a small distance between the electrodes at the two ends of the battery cell and the first surface 112, which is not conducive to the gapless bonding between the battery cell and the conductive sheet, and affects the stable electrical connection. To solve the above problems, it is preferable that the resisting part 122 is higher than the first surface 112 of the first bracket body 130 and forms a certain gap with the first surface 112. Please refer to FIG. 3 in conjunction with FIG. 2. The stopper 120 located outside the first receiving grooves 131 arranged in a honeycomb pattern includes a connecting part 121 and a resisting part 122, the stopper 120 is L-shaped, and the resisting part 122 is opposite to the edge of the first receiving groove 131. The stopper 120 between the first receiving grooves 131 arranged in a honeycomb pattern includes a connecting part 121 and two resisting parts 122, the stopper 120 is T-shaped, one resisting part 122 faces the edge of one first receiving groove 131, and the other resisting part 122 faces the edge of another first receiving groove 131. Because the resisting part 122 is higher than the first surface by a certain gap, a distance between the electrode of the battery cell and the first surface 112 caused by the injection molding process of the insulating layer of the battery cell or the bracket is counteracted, so that the electrodes at the two ends of the battery cell can be flush with or beyond the first surface 112, which facilitates the gapless bonding and stable electrical connection between the battery cell and the conductive sheet. In addition, based on the structures of the receiving groove 111 running through the base shell 110 and the T-shaped or L-shaped stopper 120, the conductive sheet can adopt a simple one-piece structure, which avoids the need to adopt a conductive sheet with a sunken welding position (protruding toward the first surface 112 of the bracket body) in the prior art for tight welding, thus reducing the cost of the bracket 100 and further reducing the cost of the conductive sheet.

In the embodiment of the application, the resisting part 122 is higher than the first surface 112 by a certain gap, which may be a thickness of the insulating layer, such as 0.3 mm, or larger than the thickness of the insulating layer, so as to offset a bonding distance between the insulating layer of the battery cell and the bracket 100 caused by the injection molding process, such as 0.5 mm. It should be noted that this application does not limit the specific height of the gap between the resisting part 122 and the first surface 112. In other embodiments of this application, the gap formed between the resisting part 122 and the first surface 112 may be 0.4 mm or 0.8 mm, preferably 0.3-0.8 mm, as long as the gap between the insulating layer of the battery cell and the bracket caused by a manufacturing process error is counteracted.

Figure 6:
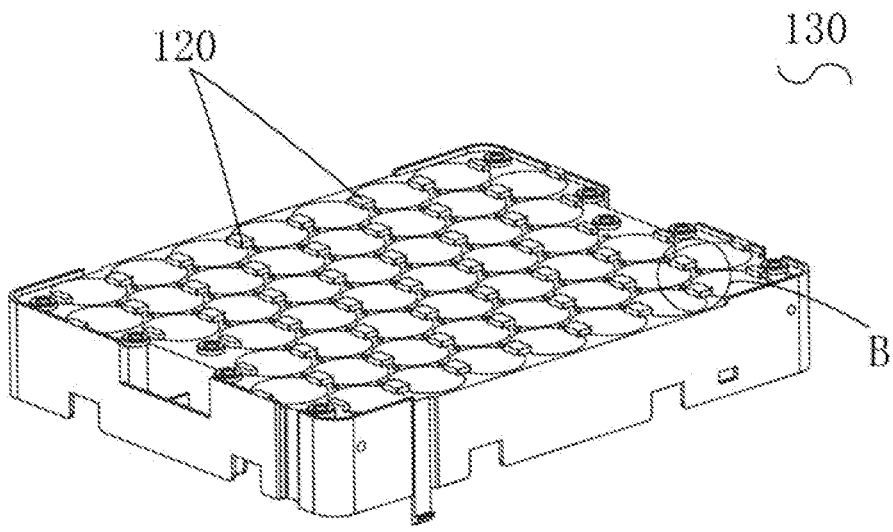
FIG. 6 is a perspective view of a bracket body of another embodiment.
Figure 7:
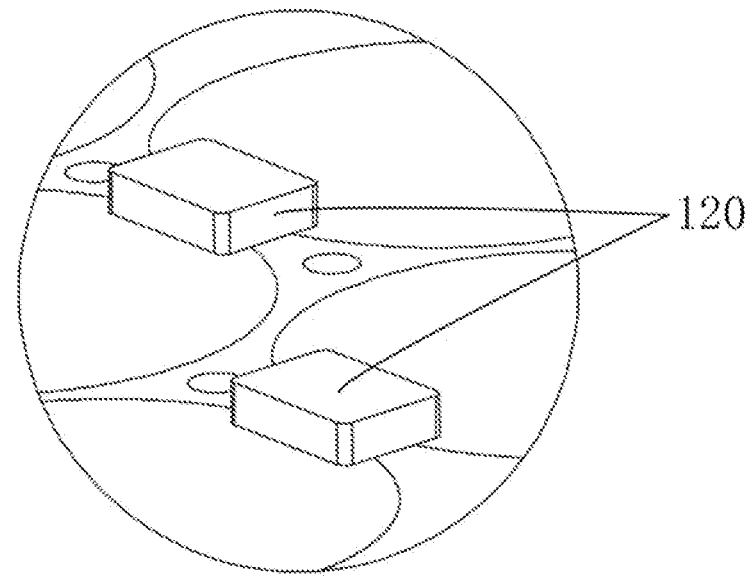
FIG. 7 is an enlarged view of part B in FIG. 6.

If the thickness of the insulating layer of the battery cell and the problem of the manufacturing process of the bracket 100 are neglected, the resisting part 122 can also be flush with the first surface 112. For details, please refer to FIGS. 6 and 7. FIG. 6 shows a perspective view of a bracket body of another embodiment, and FIG. 7 shows an enlarged view of part B in FIG. 6. In this embodiment of the application, the design of the stoppers 120 in two shapes not only meets the requirement that each battery cell is provided with two resisting parts 122 to realize two-sided abutting installation, but also integrates the stoppers 120 between the two first receiving grooves 131 of the same battery cell group 200, so as to save space and simplify the structure of the bracket 100, thus reducing the production difficulty of a mold of the bracket 100 and further reducing the production cost. It should be noted that this application does not limit the number of the resisting parts 122 corresponding to the first receiving grooves 131. In other embodiments of this application, the number of the resisting parts 122 corresponding to the first receiving grooves 131 may be one, three or four. The application does not limit the specific structure of the stopper 120. In other embodiments of this application, the structure of the stopper 120 can be adjusted according to the number of the resisting parts 122, as long as the battery cell is held in position.

Preferably, a side of the first bracket body 130 close to the second bracket body 140 is provided with a receiving cavity 133 (similarly, a side of the second bracket body 140 close to the first bracket body 130 is also provided with a receiving cavity). Please refer to FIG. 3 for details, in combination with FIGS. 1 and 2. The receiving cavity 133 is of a rectangular cavity structure matching the first bracket body 130, and two axial ends of the battery cell are received by the first receiving groove 131 and the second receiving groove 141. An axial middle part of the battery cell is received by the receiving cavity 133. The design of the receiving cavity 133 can reduce the weight of the bracket 100 under the condition of ensuring the installation strength of the battery cell, and facilitate the transportation of the battery unit 10, thus improving user experience. It should be noted that the specific shape of the receiving cavity 133 is not limited in this application, and in other embodiments of this application, the receiving cavity 133 can also be a cavity structure in a shape of a prism, cylinder, frustum, etc.

Preferably, two opposite end faces of the first bracket body 130 in a predetermined direction X are provided with grip grooves 134 on a side facing away from the second bracket body 140. The grip groove 134 extends in the predetermined direction Z and forms an opening on a side facing away from the second bracket body 140. Ribs extending in the predetermined direction X are arranged in the grip groove 134, and the ribs are used to strengthen side walls of the grip groove 134. The grip groove 134 provides a stress point when a user carries the battery unit 10, which provides convenience for use and improves user experience.

Preferably, one end of the first bracket body 130 perpendicular to the predetermined direction Y and one end perpendicular to the predetermined direction X are provided with two dismounting holes 135 at one side close to the second bracket body 140. The two dismounting holes 135 are spaced apart, and the dismounting holes 135 are rectangular with one end communicating to an edge of the first bracket body 130. Since the second bracket body 140 and the first bracket body 130 are arranged in the predetermined direction Z in a mirroring rotation mode, dismounting holes are provided on three sides of the bracket 100. The dismounting hole 135 is used to provide a stress point when the first bracket body 130 and the second bracket body 140 are dismounted, which facilitates dismounting and improves user experience. It should be noted that the application does not limit the specific shape of the dismounting hole 135. In other embodiments of the application, the dismounting hole 135 may take the shape of a cylinder, a semi-cylinder, a prism, etc., as long as stress points are provided for a user for dismounting. It should also be noted that the number of the dismounting holes 135 is not limited in this application. In this embodiment, the two dismounting holes 135 are arranged to provide two stress points for dismounting, so that the bracket 100 is stressed evenly and dismounted more conveniently. In other embodiments of this application, the number of the dismounting holes 135 can be one or more, and the dismounting holes 135 can be arranged on one, two or four surfaces of the bracket 100.

Preferably, the first bracket body 130 is provided with a plurality of heat dissipation holes 136, which are cylindrical and communicate with the receiving cavity 133, and the heat dissipation holes 136 are evenly distributed in the arrangement gaps of the plurality of receiving grooves 111. The heat dissipation holes 136 are used for dissipating heat from the receiving cavity 133, so that heat generated when the battery cells work can be discharged to the outside environment, thus preventing the temperature of the battery unit 10 from rising due to poor heat dissipation during the working process, which may affect the normal operation of the battery unit 10. It should be noted that the specific shape of the heat dissipation hole 136 is not limited in this application. In other embodiments of this application, the heat dissipation hole 136 may take other shapes such as semi-cylinder, prism, frustum, etc., as long as the communication between the receiving cavity 133 and the external environment is realized.

Preferably, the battery unit 10 further includes highland barley paper 600. Please refer to FIG. 2. The highland barley paper 600 is provided with a plurality of electrode through holes 601 and positioning through holes 602, the electrode through holes 601 correspond to the welding holes 301, the positioning through holes 602 correspond to the positioning holes 302 and match the stoppers 120, and the highland barley paper 600 is arranged between the first bracket body 130 and the first conductive sheet 300, and between the second bracket body 140 and the second conductive sheet 400 and the third conductive sheet 500. The first conductive sheet 300, the second conductive sheet 400 and the third conductive sheet 500 are welded with the electrodes of the battery cells through the electrode through holes 601, and the highland barley paper 600 is used to prevent a positive electrode and a negative electrode of the battery cell from communicating in the external environment of the battery cell to cause a short circuit.

The bracket 100 of this embodiment is provided with the stopper 120, and the resisting part 122 of the stopper 120 is arranged opposite to the receiving groove 111, so that the stopper 120 abuts against the end of the battery cell, thereby realizing the installation of the battery cell on the bracket 100, further improving the current situation that for an existing bracket, a battery cell is fixed through a shielding part, which makes it inconvenient to weld the conductive sheet with the battery cell; besides, the selection range of the conductive sheet is widened, and the manufacturing difficulty of the conductive sheet is reduced. The bracket 100 provided by the embodiment of the application can adopt a one-piece planar conductive sheet with the lowest processing difficulty and the lowest cost, and can avoid using a concave conductive sheet with high processing difficulty and high cost, thereby reducing the processing difficulty and production cost. Further, the bracket 100 provided by the embodiment of the application has a simple structure and is formed by two identical first bracket bodies 130, only one mold is needed in production, the manufacturing difficulty of the mold is low, and the production cost is low. In addition, in this embodiment, the battery cells face opposite directions, two battery cell groups are connected in series under one battery cell height, and the battery cells are arranged in a honeycomb pattern, so that the structure of the battery unit 10 is more compact and the space utilization rate is higher.

Figure 8:
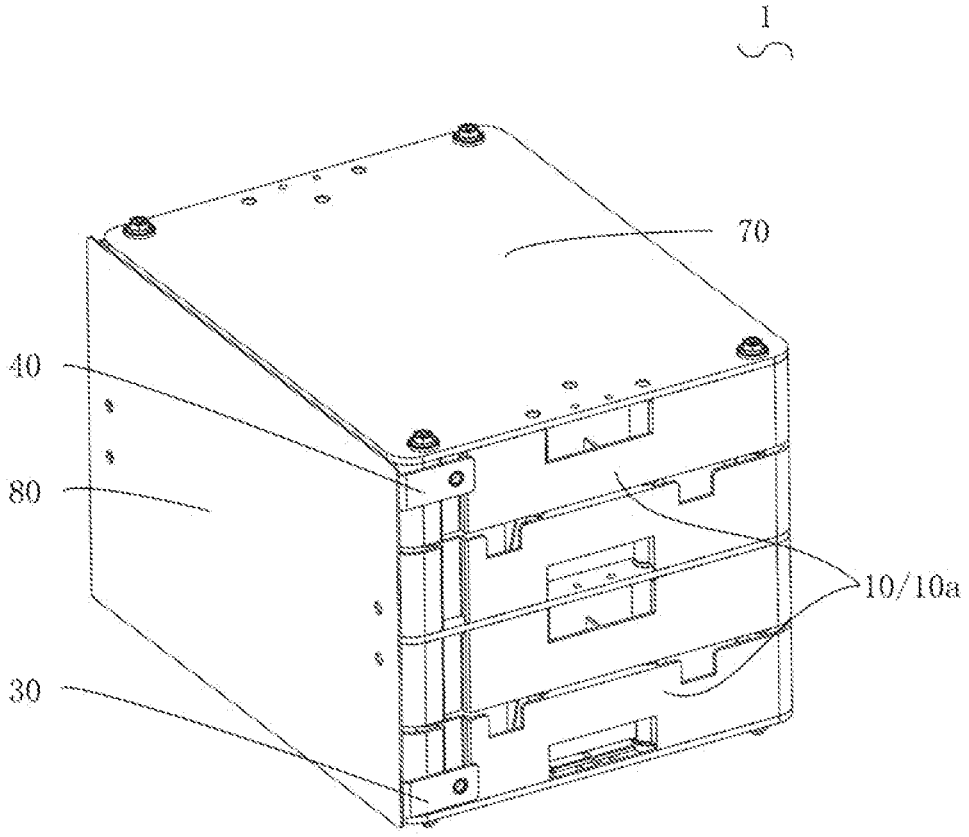
FIG. 8 is a perspective view of an energy storage power supply composed of a single battery unit module in this embodiment.
Figure 9:
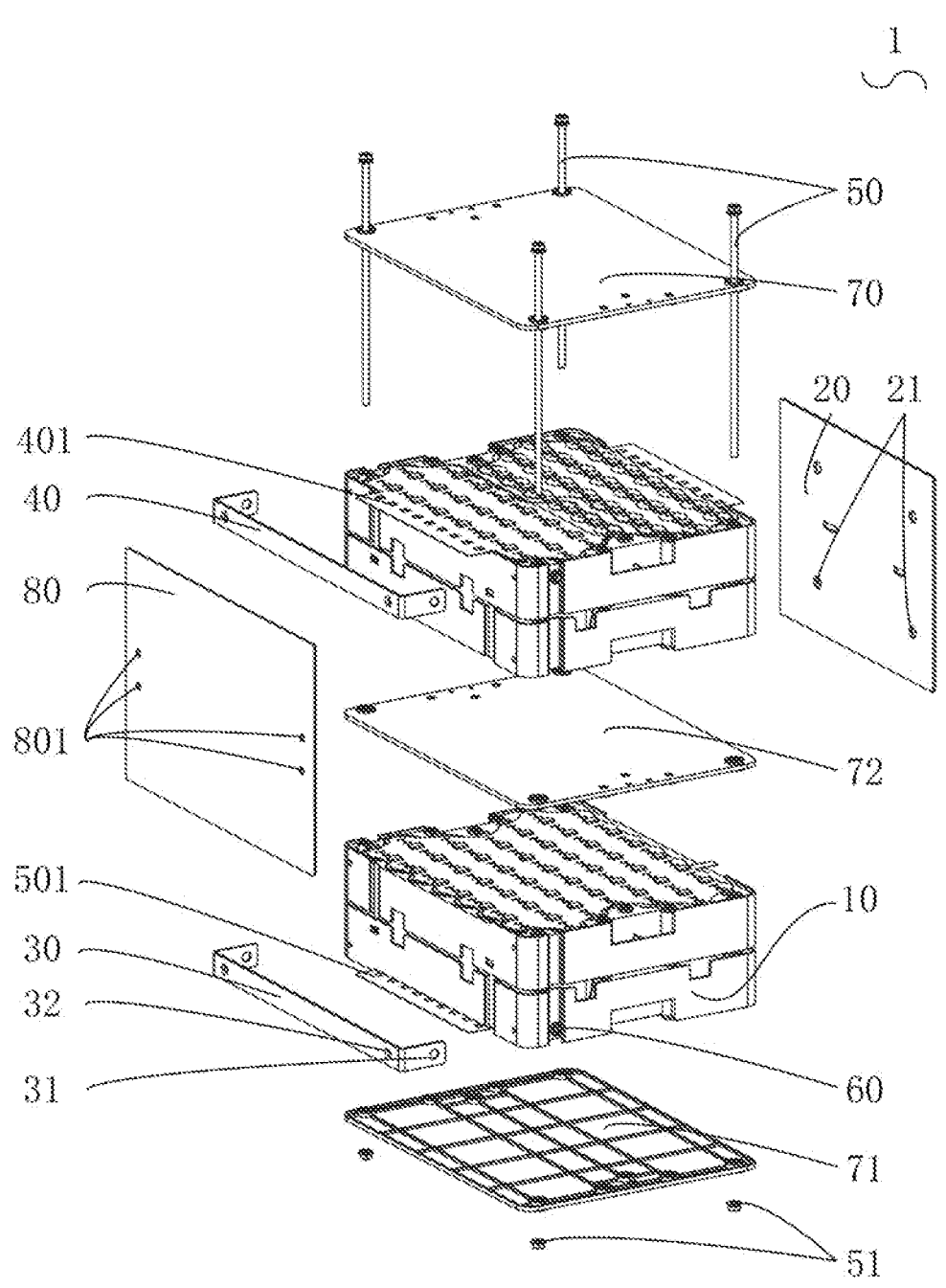
FIG. 9 is an exploded view of an energy storage power supply composed of a single battery unit module in this embodiment.

Based on the same inventive concept, this application also provides an energy storage power supply 1. Please refer to FIGS. 8 and 9 for details. FIGS. 8 and 9 respectively show a perspective view and an exploded view of an energy storage power supply composed of a single battery unit module in this embodiment. The energy storage power supply 1 includes the battery unit 10 in the above embodiment, a conductive member 20, a positive electrode bus structure 30 and a negative electrode bus structure 40. The number of the battery units 10 is two, and the two battery units 10 are relatively fixed in a direction perpendicular to the first surface 112 and the second surface 113, and are stacked to form a battery unit module 10a. The conductive member 20 is fixed to the two battery units 10 and used for electrical connection of the two battery units 10. The positive electrode bus structure 30 is fixed to one of the battery units 10, electrically connected to a total positive electrode of the battery unit module 10*a*, and leads out a positive electrode. The negative electrode bus structure 40 is fixed to another battery unit 10, electrically connected to a total negative electrode of the battery unit module 10*a*, and leads out a negative electrode. It should be noted that the number of the battery units 10 is not limited in this application. In other embodiments of this application, the number of the battery units 10 constituting the battery unit module 10*a* may be three, four, etc., the plurality of battery units 10 are electrically connected by the conductive member 20, and the positive electrode bus structure 30 and the negative electrode bus structure 40 are electrically connected to the battery unit module 10*a* and lead out the positive and negative electrodes.

Please refer to FIG. 9 in combination with FIG. 8 for the conductive member 20. The conductive member 20 includes a circuit board, and through holes 137 are formed at four corners of the first surface 112 of the first bracket body 130. The battery unit module 10*a* further includes a screw 50 and a bolt 51. The screw 50 matches the bolt 51 through the through holes 137 to fix and install the two battery units 10, and the conductive member 20 is arranged parallel to the predetermined direction Z and perpendicular to the predetermined direction Y and fixed to side walls of the two battery units. Specifically, the first bracket body 130 is provided with a first clamping part 138 close to the second bracket body 140, and the conductive member 20 is provided with a second clamping part 2121. Because the second bracket body 140 and the first bracket body 130 have the same structure and the second bracket body 140 can rotate in the predetermined direction Z in a mirroring mode, the second bracket body 140 is also provided with a first clamping part 138. The first clamping parts 138 and the second clamping parts 2121 of the first bracket body 130 and the second bracket body 140 are used to cooperate with each other to clamp and fix the battery unit 10 and the conductive member 20. The conductive member 20 is used to electrically connect the third conductive sheet 500 of one battery unit 10 with the second conductive sheet 400 of another battery unit 10, thereby realizing series connection between the two battery units 10. It should be noted that this application does not limit the specific installation method of the conductive member 20 on the first bracket body 130. In other embodiments of this application, the conductive member 20 can be fixed to the first bracket body 130 by other installation methods such as screwing and hinging, so as to realize the fixation and installation of the conductive member 20 on the first bracket body 130.

For the positive electrode bus structure 30 and the negative electrode bus structure 40, please refer to FIG. 9 in combination with FIG. 8. Both the positive electrode bus structure 30 and the negative electrode bus structure 40 are copper bars and are fixed to a side of the battery unit 10 facing away from the conductive member 20. The positive electrode bus structure 30 is welded with a first lug 401 extending from the second conductive sheet 400 of one battery unit 10, and the negative electrode bus structure 40 is welded with a second lug 501 extending from the third conductive sheet 500 of another battery unit 10. Specifically, the battery unit module 10*a* further includes a mounting block 60 and screws. Two opposite surfaces of the first bracket body 130 in the predetermined direction X are provided with mounting grooves 139 extending in the predetermined direction Z, a width of the mounting groove 139 matches an outer contour of the mounting block 60, and two ends of the positive electrode bus structure 30 and the negative electrode bus structure 40 extend around a side wall of the first bracket body 130 in the predetermined direction Y. Two ends of the positive electrode bus structure 30 and the negative electrode bus structure 40 are provided with first mounting holes 31 matching the mounting block 60, and the mounting block 60 is partially received by and installed in the first mounting holes 31. One end of the first bracket body 130 facing away from the conductive member 20 is provided with a screw hole 1301 (see FIG. 2 for details), and the positive electrode bus structure 30 and the negative electrode bus structure 40 are provided with second mounting holes 32, through which screws are screwed into the screw holes 1301. The positive electrode bus structure and the negative electrode bus structure are mounted and fixed to the battery unit 10 through the first mounting hole 31 and the second mounting hole 32.

Figure 10:
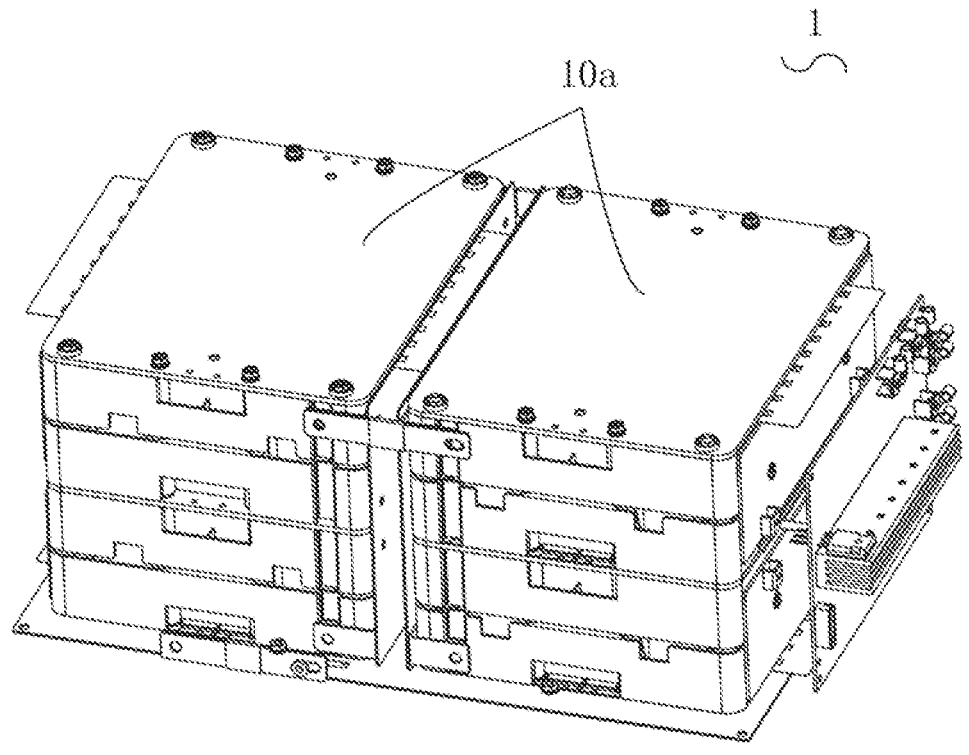
FIG. 10 is an installation diagram of an energy storage power supply composed of a plurality of battery unit modules in this embodiment.
Figure 11:
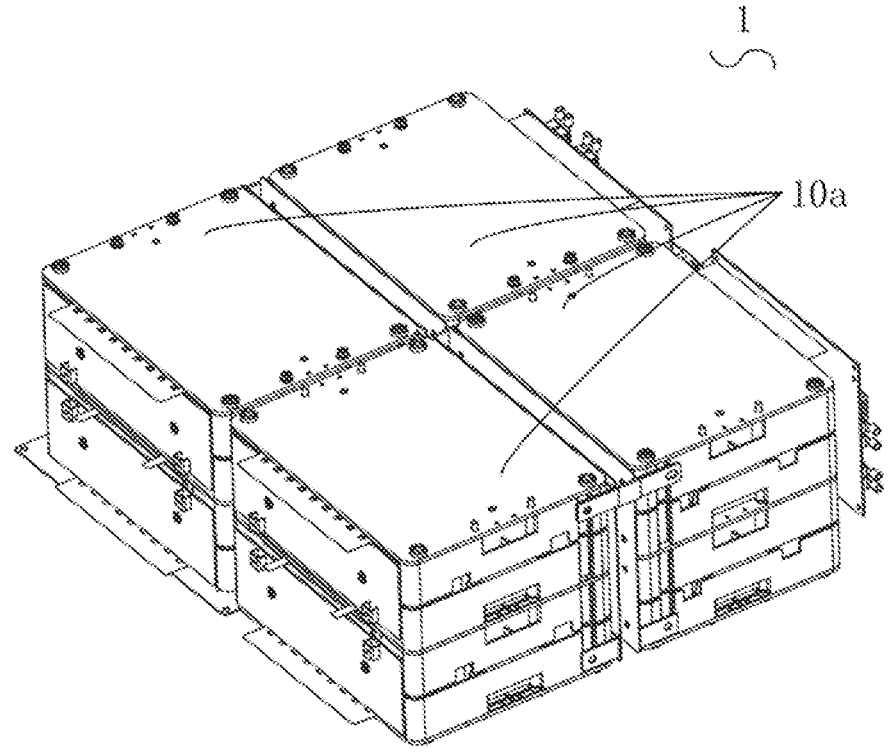
FIG. 11 is an installation diagram of another energy storage power supply composed of a single battery unit module in this embodiment.

Because the positive electrode bus structure 30 and the negative electrode bus structure 40 are arranged around three sides of the first bracket body 130, electrical connection between a plurality of battery unit modules 10*a* is facilitated. Please refer to FIGS. 10 and 11, which show the installation diagrams of two energy storage power supplies composed of a plurality of battery unit modules. The multiple battery unit modules 10*a* can be electrically connected by welding soft copper bars, bridge copper bars or wires between the positive electrode bus structure 30 and the negative electrode bus structure 40 on one side facing away from the conductive member 20 or two opposite sides in the predetermined direction X. On the one hand, the positive electrode bus structure 30 and the negative electrode bus structure 40 facilitate the electric connection between the battery unit modules 10*a* in three directions, with a simple structure, a small space, a large and short overcurrent, and a reduced voltage difference, and at the same time, the connection of a power line anode and a power line cathode of the whole energy storage power supply 1 is facilitated, so that power is supplied to electrical equipment. On the other hand, soft copper bars, bridge copper bars or wires can resist pulling caused by vibration. It should be noted that the application does not limit the specific mounting methods of the positive electrode bus structure 30 and the negative electrode bus structure 40 on the first bracket body 130. In other embodiments of the application, the positive electrode bus structure 30 and the negative electrode bus structure 40 can be fixed to the first bracket body 130 by welding or bonding. The positive electrode bus structure 30 and the negative electrode bus structure 40 are preferably copper bars.

Preferably, the battery unit module 10*a* further includes a top shell 70, a bottom shell 71, an insulating clamp plate 72 and an insulating side plate 80. Please refer to FIG. 9 for details, in combination with FIG. 8. The top shell 70, the bottom shell 71 and the insulating clamp plate 72 are all rectangular plate-like structures and match a cross section of the first bracket body 130 in the predetermined direction Z. The top shell 70 and the bottom shell 71 are fixed to two ends of the two battery units 10 in the predetermined direction Z, and the insulating clamp plate 72 is arranged between two battery units 10. The insulation clamp plate 72 can prevent a short circuit between the two battery units 10. The insulating side plate 80 includes an epoxy plate, has a rectangular plate-like structure and matches cross sections of the two battery units 10 in the predetermined direction Y. The insulating side plate 80 is arranged on a side of the positive electrode bus structure 30 facing away from the battery unit module 10*a*, and is provided with an installation through hole 801, and the insulating side plate 80 is fixed to the first bracket body 130 by a screw through the installation through hole 801. The top shell 70, the bottom shell 71, and the insulating side plate 80 are used for relative isolation of the battery unit module 10*a* from the external environment, preventing the first conductive sheet 300, the second conductive sheet 400, the third conductive sheet 500, the positive electrode bus structure 30, and the negative electrode bus structure 40 from being directly exposed to the air, thereby reducing the possibility of electric shock of users during use. In addition, the arrangement of the top shell 70, the bottom shell 71 and the insulating side plate 80 can protect the battery unit module 10*a*, and can reduce the possibility of damage when the battery unit module 10*a* is impacted by external forces.

The conductive member 20 of this embodiment includes a circuit board, and the battery units 10 are connected in series through the circuit board, so that complicated wiring is avoided, manual operation is reduced, and the appearance of the battery unit module 10*a* is neater. In addition, the battery cells of the battery unit 10 in this embodiment face opposite directions, so that the battery unit module 10*a* provided in this application realizes the series connection of four battery cell groups under two battery cell heights, and the battery cells of the battery unit 10 are arranged in a honeycomb pattern, so that the structure of the battery unit 10 is more compact and the space utilization rate is higher.

Compared with the prior art where more than two battery units 10 are stacked basically in the same direction, either vertically or horizontally, in this application, through the positive electrode bus structure 30 and the negative electrode bus structure 40, on the one hand, a plurality of battery units 10 are stacked and electrically connected in the horizontal and vertical directions, and a length of the whole battery unit module 10*a* in a single direction is reduced, so that the structure of the battery unit module 10*a* is compact, thereby facilitating the transportation of the whole energy storage power supply 1 and improving user experience; and on the other hand, currents are converged through the positive current flow structure 30 and the negative current flow structure 40 of the application, which is beneficial to balanced distribution of currents and avoids untimely shunting and heat accumulation caused by concentration of currents in a small area.

It should be noted that the specification of this embodiment and drawings show preferred embodiments of this embodiment. However, this embodiment can be implemented in many different forms, and is not limited to the embodiments described in this specification. These embodiments are not taken as additional restrictions on the contents of this embodiment, but are provided for a more thorough and comprehensive understanding of the disclosure of this embodiment. In addition, the above technical features continue to be combined with each other to form various embodiments not listed above, all of which are regarded as the scope described in the specification of this embodiment. Further, those skilled in the art can make improvements or changes according to the above description, and all these improvements and changes should fall within the scope of protection of the appended claims of this embodiment.

What is claimed is:

1. A bracket, comprising:
a first bracket body and a second bracket body;

wherein the second bracket body rotates relative to the first bracket body in a mirroring mode in a predetermined direction, and is fixed to the first bracket body in a laminating mode; and each of the first bracket body and the second bracket body comprises:

a base shell, the base shell being provided with a receiving groove for receiving a battery cell, the receiving groove running through a first surface and a second surface of the base shell, and the first surface and the second surface being two opposite surfaces of the base shell;

a first stopper comprising a first connecting part and a first resisting part, the first connecting part being fixed to the first surface of the base shell and avoiding the receiving groove, the resisting part being connected to the first connecting part, and the resisting part corresponding to the receiving groove and covering a part of an edge of the receiving groove, wherein the first stopper is integrally formed with the base shell, and a second stopper comprising a second connecting part and two resisting parts, the second connecting part being fixed to the first surface of the base shell and avoiding the receiving groove, the two resisting parts being connected to the second connecting part, and the two resisting parts corresponding to the receiving groove and covering a part of an edge of the receiving groove, wherein the second stopper is integrally formed with the base shell, wherein the first resisting part, and the two resisting parts are higher than the first surface of the base shell and form a gap with the first surface;

the first surface of the base shell is mounted by a planar conductive sheet, the planar conductive sheet is provided with a plurality of positioning holes, and positions, shapes and sizes of the plurality of positioning holes correspond to the first stopper and the second stopper; wherein the plurality of positioning holes play a positioning role when the planar conductive sheet is mounted on the first surface, so as to prevent the deviation of a mounting position from affecting the welding effect, the battery cell is installed in the receiving groove, and the resisting parts of the bracket body are abutting against a part of an edge at one end of the battery cell to prevent the battery cell from sliding out of the bracket body from the first surface;

wherein the receiving groove of the first bracket body and the receiving groove of the second bracket body are connected for receiving one battery cell, and the stoppers of the first bracket body and the stoppers of the second bracket body are respectively arranged at opposite site ends.

2. The bracket according to claim 1, wherein the base shell is provided with a plurality of receiving grooves arranged in a honeycomb pattern.

3. The bracket according to claim 2, wherein the stopper comprises the connecting part and at least one resisting part, and each of the at least one resisting part corresponds to and covers the part of the edge of one receiving groove of the plurality of receiving grooves.

4. The bracket according to claim 1, wherein a height of the gap is 0.3-0.8 mm.

5. The bracket according to claim 1, wherein the first stopper is L-shaped and the second stopper is T-shaped.

* * * * *